Aug. 11, 1964
A. SMITH
3,143,906
TOOL POST FOR A MACHINE TOOL
Filed April 15, 1963
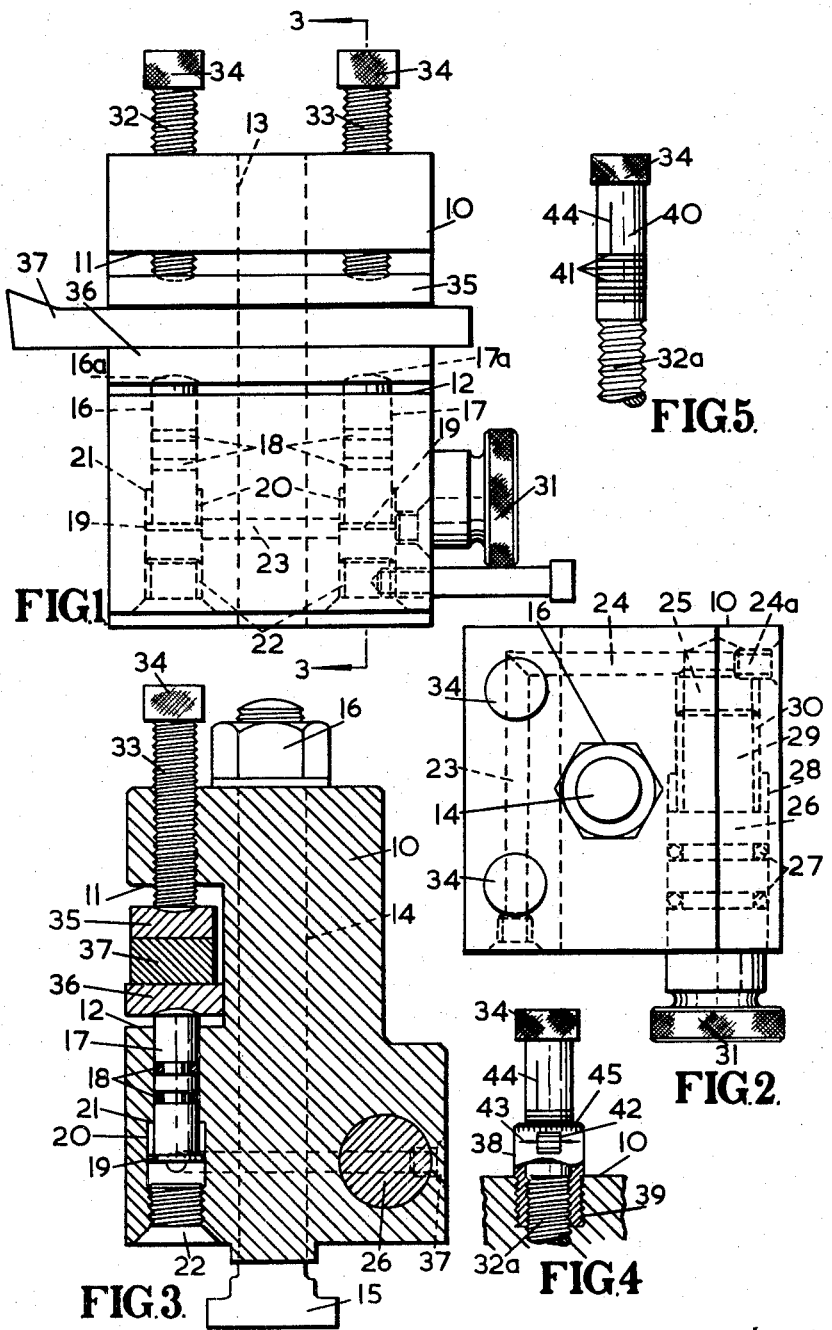
Inventor
By
Attorney United States Patent Office 3,143,906
Patented Aug. 11, 1964

3,143,906
TOOL POST FOR A MACHINE TOOL
Alfred Smith, Bulkington, near Nuneaton, England, assignor to Comet Appliances Limited, Bulkington, near Nuneaton, England
Filed Apr. 15, 1963, Ser. No. 273,096
10 Claims. (Cl. 82—37)

The invention relates to a tool post which is adapted to be fitted to a machine tool, for example, a lathe, and it has for its object to enable a cutting tool to be positioned accurately in relation to the work in a simple manner.

According to the invention a tool post, adapted to be fitted to a machine tool, includes a body formed with spaced parallel surfaces between which the shank of a cutting tool is to be mounted, the body being provided with a pair of plungers which extend through one of the said surfaces to engage one side of the tool shank and are adapted to be operated by fluid pressure to hold the opposite side of the said shank in engagement with means which extend from the other surface and set the attitude in which the tool is to be held.

According to a feature of the invention the body of the tool post is formed with respective parallel bores in which the plungers work and with a cylinder which communicates with the inner ends of the bores, the cylinder having a coacting piston which has a screw-threaded engagement in the body such that when the piston is rotated it will be moved axially of the cylinder and cause fluid within the latter to displace the plungers axially of their respective bores.

According to a further feature the setting means takes the form of parallel posts having independent screw-threaded engagements wtih the body.

According to a still further feature each of these posts and the body are provided with coacting indicia for enabling the post to be pre-set to a predetermined operative position.

In the accompanying drawings:

FIGURE 1 is a side elevation of one form of tool post, in accordance with the invention, for use on a lathe and showing a cutting tool in position;

FIGURE 2 is a corresponding plan view which has been turned through a right angle;

FIGURE 3 is a section on the line 3—3 of FIGURE 1, and

FIGURES 4 and 5 illustrate a modified detail.

Referring to FIGURES 1 to 3, the tool post includes a body 10 having a lateral gap providing opposed, parallel surfaces 11 and 12, and a through bore 13 for a mounting post 14 which has means 15 at its foot for engagement in a tool slide of the lathe and its head screw-threaded to receive a nut 16 for holding the tool post firmly in position.

The body is formed with a pair of spaced parallel bores accommodating respective plungers 16, 17 which are provided with sealing rings 18 and have their heads 16a, 17a adapted to extend above surface 12. Each plunger is provided with a radially-extending flange 19 at its inner end working in an enlargement 20 of the respective bore, and the flange is adapted to coact with the step 21 in the bore for limiting outward movement of the plunger. For manufacturing purposes the enlarged bore portions 20 are machined through the bottom of the body and the open ends closed by respective screw-threaded plugs 22. It is arranged for a space between each flange 19 and plug 22 to intercommunicate through a duct 23, and for the latter to communicate through a duct 24 with a cylinder 25 in which works a piston 26. The bore 24 is machined through the rear of the body and the open end is closed by a screw-threaded plug 24a.

Piston 26 is provided with sealing rings 27, 27, and is sealingly guided in a smooth-bore portion 28 in the body. The inner end 29 of the piston is of reduced diameter and has a screw-threaded engagement at 30 with the body. At its outer end the piston has a knurled head 31 by which it can be turned.

As thus far described it will be seen that a fluid (e.g., a suitable oil) contained in cylinder 25, the ducts 23 and 24, and in the spaces between flanges 19 and plugs 22 will be displaced by rotating piston 26 such as to cause plungers 16 and 17 to move axially in their respective bores. For one direction of rotation of the piston the plungers will be urged upwardly in their bores, and when the piston is rotated reversely the plungers will be drawn downwardly therein.

Extending through surface 11 is a pair of posts in the form of screws 32, 33 having knurled heads 34, 34, and as shown in FIGURE 1 the noses of these screws engage depressions in an upper pressure plate 35. Similarly the noses 16a, 17a of the plungers are shown as engaging depressions in a lower pressure plate 36. The tool shank 37 is adapted to be gripped between these pressure plates. The depressions in the two pressure plates may be elongated so as to cater for the said plates being tilted. It should be understood, however, that the pressure plates could be omitted such that the post and plunger noses engage the tool shank directly.

In operation, the screws 32 and 33 are set for holding the tool at an appropriate height and in a desired angular attitude, and the tool is clamped in that position by turning piston 26 for raising the plungers 16 and 17. Owing to the screw-threaded engagement 30 of the piston in the body the arrangement is hydraulically locked in this position. When the tool is to be released the piston 26 will be rotated in the opposite direction so as to cause plungers 16 and 17 to descend in their respective bores.

FIGURES 4 and 5 show how the noses of screws 32 and 33 can be pre-set accurately in predetermined positions, one of the screws, marked 32a, only being shown. It will be seen that the screw works not only in a coacting screw-thread in the body 10, but also in an internal screw-thread of a cylindrical sleeve 38 which has an external screw-thread 39 by which it is held in position in the said body. The screw has a plain upper portion 40 with annular graduations 41 spaced by an amount equal to the pitch of the screw-thread on the screw. These graduations, which can conveniently be numbered on portion 40, can be viewed through a window 42 in sleeve 38a, the window being provided with index markings 43. The portion 40 can also be provided with an axially directed index mark 44 to coact with a calibration 45 at the top of the sleeve for providing a fine adjustment.

It will be seen that the apparatus above described enables the tool to be set accurately, and simply, in a desired position, and at an appropriate inclination relatively to a workpiece in the lathe.

What I claim as my invention and desire to secure by Letters Patent of the United States is:

1. A tool post adapted to be held in position in a machine tool for supporting a cutting tool relatively to a workpiece mounted in the machine tool, the tool post comprising a body formed with spaced parallel surfaces between which the shank of the cutting tool is adapted to be mounted, a pair of posts for engaging one side of the tool shank, each said post having an independent screw-threaded engagement with said body and adapted to extend through one of said parallel surfaces, said body provided with a pair of parallel bores extending through the other of said pair of parallel surfaces, respective plungers in said bores, and means for applying fluid pressure to said plungers for urging them into engagement with the shank of the tool whereby to clamp the said shank against the opposed ends of said posts.

2. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and adapted for one end to extend into the gap through one of said parallel surfaces, said body provided with a pair of parallel bores extending into the gap through the other of said pair of parallel surfaces, respective plungers in said bores, and means for applying fluid pressure to said plungers for urging them into engagement with the shank of the tool whereby to clamp the said shank against the opposed ends of said posts.

3. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and adapted for one end to extend into the gap through one of said parallel surfaces, said body provided with a pair of parallel bores extending into the gap through the other of said pair of parallel surfaces, respective plungers in said bores, said plungers and posts respectively aligned with each other, and means for applying fluid pressure to said plungers for urging them into engagement with the shank of the tool whereby to clamp the said shank against the opposed ends of said posts.

4. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and adapted for one end to extend into the gap through one of said parallel surfaces, said body provided with a pair of parallel bores extending into the gap through the other of said pair of parallel surfaces, respective plungers in said bores, said plungers and posts respectively aligned with each other, said body formed with a cylinder, said cylinder communicating with said bores, said cylinder and said bores and their communications adapted to contain a fluid, a coacting piston in said cylinder, and means for displacing said piston axially of said cylinder to apply fluid pressure to said plungers for urging them into engagement with the shank of the tool and to clamp the said shank against the opposed ends of said posts.

5. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and adapted for one end to extend into the gap through one of said parallel surfaces, said body provided with a pair of parallel bores extending into the gap through the other of said pair of parallel surfaces, respective plungers in said bores, said plungers and posts respectively aligned with each other, said body formed with a cylinder, said cylinder communicating with said bores, said cylinder and said bores and their communications adapted to contain a fluid, a coacting piston in said cylinder, said piston having a screw-threaded engagement with said body such that when said piston is rotated it will be axially displaced in said cylinder to apply fluid pressure to said plungers for urging them into engagement with the shank of the tool whereby to clamp the said shank against the opposed ends of said posts.

6. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and adapted for one end to extend into the gap through one of said parallel surfaces, said body provided with a pair of parallel bores extending into the gap through the other of said pair of parallel surfaces, respective plungers in said bores, said plungers and posts respectively aligned with each other, and said body formed with a cylinder, said cylinder communicating with said bores, said cylinder and said bores and their communications adapted to contain a fluid, a coacting piston in said cylinder, said piston having a screw-threaded engagement with said body, said piston having a portion extending outwardly of said body such that when the outwardly extending portion of said piston is rotated said piston will be axially displaced in said cylinder to apply fluid pressure to said plungers for urging them into engagement with the shank of the tool whereby to clamp the said shank against the opposed ends of said posts.

7. A tool post adapted to be held in position in a machine tool for supporting a cutting tool relatively to a workpiece mounted in the machine tool, the tool post comprising a body formed with spaced parallel surfaces between which the shank of the cutting tool is adapted to be mounted, a pair of posts for engaging one side of the tool shank, each said post having an independent screw-threaded engagement with said body and adapted for one end to extend through one of said parallel surfaces, said body provided with a pair of parallel bores extending through the other of said pair of parallel surfaces, respective plungers in said bores, the other ends of said posts extending outwardly of said body, the extending ends of said posts and said body provided with coacting indicia for enabling said posts to be set for their said one ends to extend into the gap by predetermined amounts, and means for applying fluid pressure to said plungers for urging them into engagement with the shank of the tool whereby to clamp the said shank against the opposed ends of said posts.

8. A tool post according to claim 7 in which the coacting indicia are in the form of annular markings on said posts and an index marking on said body to provide a coarse adjustment in terms of the pitch of the screw-threads interconnecting said posts and body, and an axial index marking on the outwardly extending other ends of said posts to coact with radial markings on said body to provide a finer adjustment.

9. A tool post adapted to be held in position in a machine tool for supporting a cutting tool relatively to a workpiece mounted in the machine tool, the tool post comprising a body formed with a lateral gap defining a pair of spaced parallel surfaces between which the shank of the cutting tool is adapted to be mounted, a pair of posts for engaging one side of the tool shank, each said post having an independent screw-threaded engagement with said body and apdated for one end to extend into the gap through one of said parallel surfaces, the other ends of said posts extending outwardly of said body, the extending ends of said posts and said body provided with coacting indicia for enabling said posts to be set for their said one ends to extend into the gap by predetermined amounts, said body provided with a pair of parallel bores extending into the gap through the other of said pair of parallel surfaces, respective plungers in said bores, said plungers and posts respectively aligned with each other, said body formed with a cylinder, said cylinder communicating with said bores, said cylinder and said bores and their communications adapted to contain a fluid, a coacting piston in said cylinder, said piston having a screw-threaded engagement with said body, said piston having a portion extending outwardly of said body such that when the outwardly extending portion of said piston is rotated said piston will be axially displaced in said cylinder to apply fluid pressure to said plungers for urging them into engagement with the shank of the tool whereby to clamp the said shank against the opposed ends of said posts.

10. A tool post according to claim 9 in which the coacting indicia are in the form of annular markings on said posts and an index marking on said body to provide a coarse adjustment in terms of the pitch of the screw-threads interconnecting said posts and body, and an axial index marking on the outwardly extending other ends of said posts to coact with radial markings on said body to provide a finer adjustment.

No references cited.